United States Patent [19]

Moser et al.

[11] Patent Number: 4,526,044

[45] Date of Patent: Jul. 2, 1985

[54] LOAD SENSING PROBE

[75] Inventors: Robert L. Moser, Toledo; Donald F. Wilhelm, Maumee, both of Ohio

[73] Assignee: Helm Instrument Company, Inc., Maumee, Ohio

[21] Appl. No.: 546,727

[22] Filed: Oct. 28, 1983

Related U.S. Application Data

[63] Continuation-in-part of Ser. No. 348,992, Feb. 16, 1982, Pat. No. 4,412,456.

[51] Int. Cl.³ .............................. G01L 1/22; G01L 5/00
[52] U.S. Cl. ................................... 73/862.06; 73/768; 73/862.65
[58] Field of Search ............... 73/767, 768, 774, 781, 73/783, 784, 855, 862.60, 862.04, 862.06, 862.65, 862.54; 338/5

[56] References Cited

U.S. PATENT DOCUMENTS

| 2,898,761 | 8/1959 | Hast | 73/862.69 X |
| 4,199,978 | 4/1980 | Knorring et al. | 73/862.69 X |
| 4,200,855 | 4/1980 | Gilcher | 338/5 |
| 4,342,233 | 8/1982 | Edmondson et al. | 73/862.06 |

Primary Examiner—Charles A. Ruehl

Attorney, Agent, or Firm—Fraser & Clemens

[57] ABSTRACT

A load sensing probe for disposition in a cavity in a back-up member arranged to support a tool at a working station for measuring the strain associated with such working forces applied to the tool comprises a generally cylindrical body member having first and second generally end adjacent regions of substantially equal outside diameter and a third intermediate region of reduced size. A centrally disposed bore extends through the cylindrical member. A first pair of slots extend axially inwardly into the intermediate region and a second pair of slots extend from the second region into the intermediate region and are disposed at a right angle to first pair of slots. A threaded rod having a frusto-conical surface extends through the centrally disposed bore and includes a threaded fastener. This assembly may be utilized to apply outwardly directed forces to the body of the probe to retain it within the cavity of the tool. Strain gauges are secured on a radially extending surface of one of the end regions and measure the dimensional change of the cavity. Opposed flats on the opposite end of the body member permit rotation of the body member in the cavity during installation.

17 Claims, 9 Drawing Figures

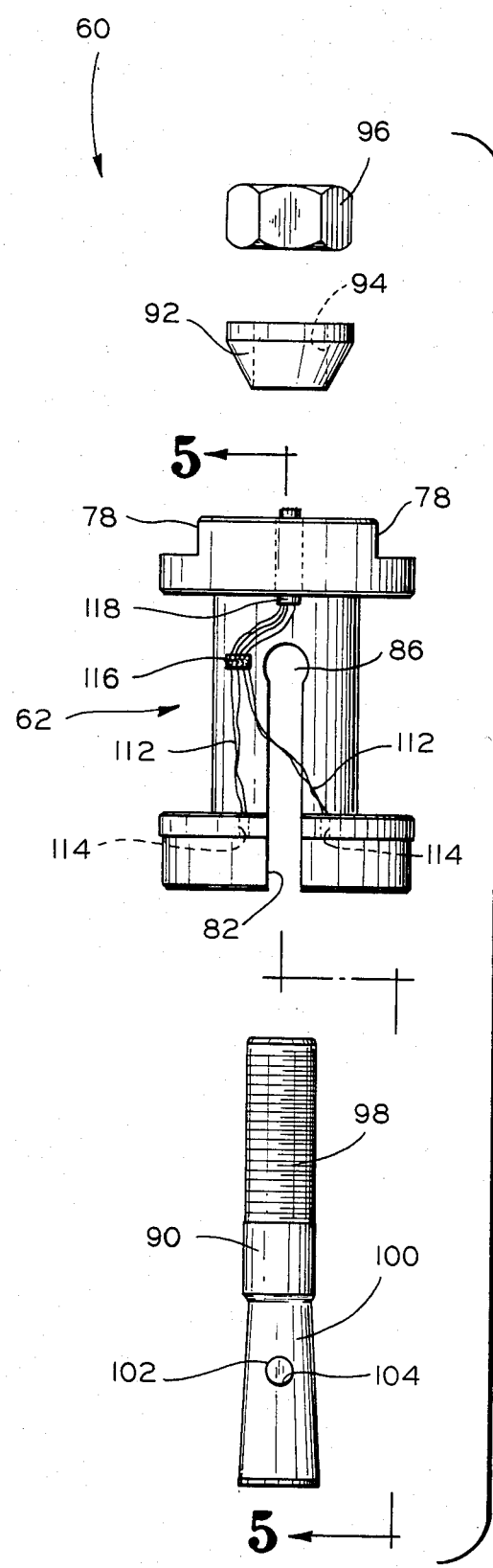
FIG. 3
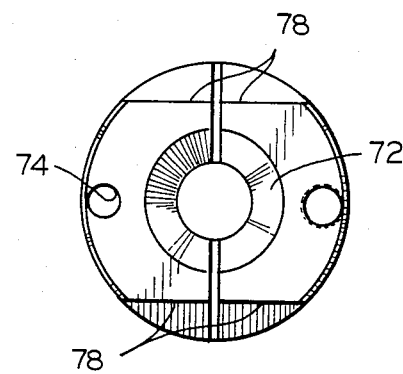
FIG. 4
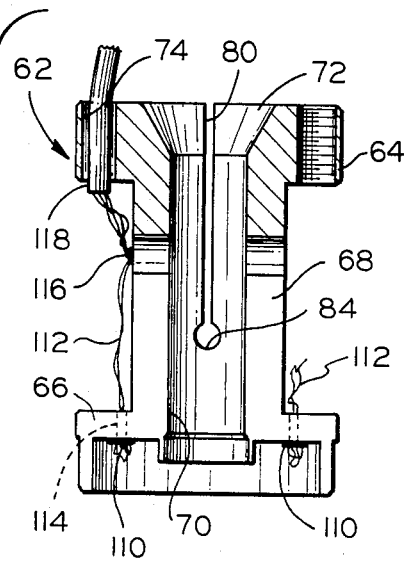
FIG. 5
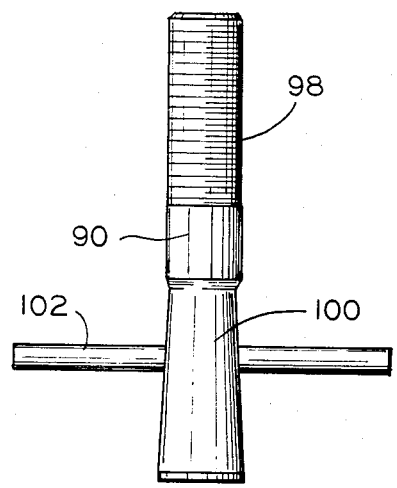

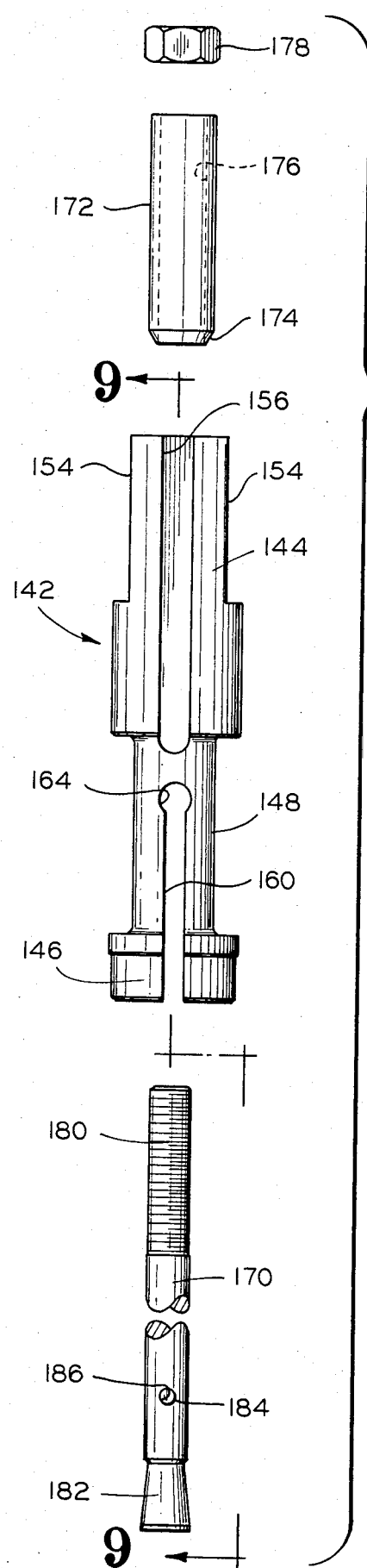
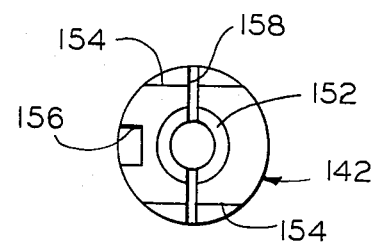
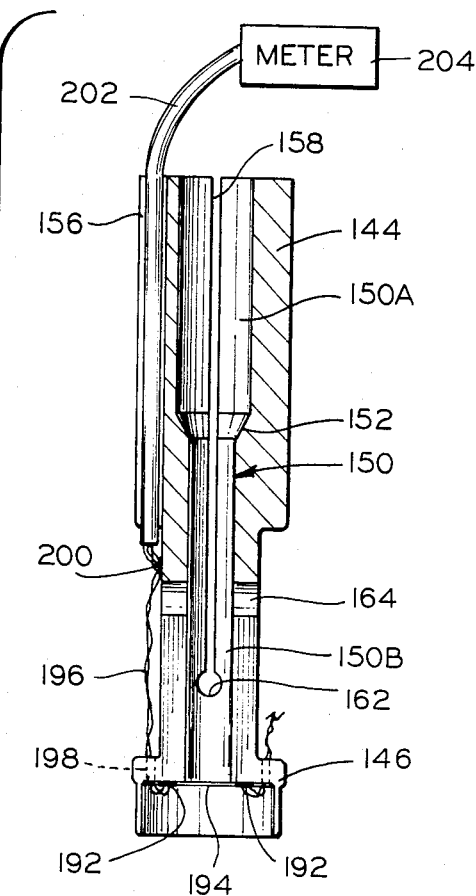
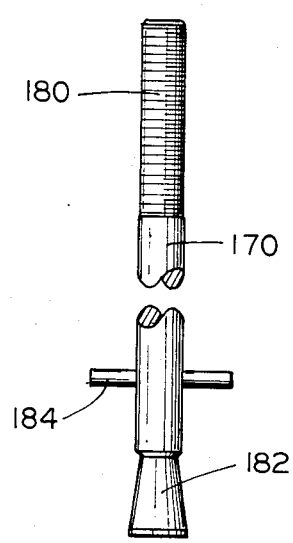
FIG. 7
FIG. 8
FIG. 9

LOAD SENSING PROBE

CROSS REFEFENCE TO CO-PENDING APPLICATION

This application is a continuation-in-part of U.S. patent application Ser. No. 348,992, filed Feb. 16, 1982, now U.S. Pat. No. 4,412,456, granted Nov. 1, 1983.

BACKGROUND OF THE INVENTION

1. Field of the Invention

The present invention relates in general to force-sensitive transducers and in particular to a load sensing probe for measuring the work forces present in a machine tool.

2. Description of the Prior Art

The ability to measure force or load is a vital part of many industrial processes. Recognizing that a structure undergoes a dimensional change when subjected to a load, a measure of the dimensional change in a structure can accurately indicate the amount of load or force applied thereto. Such measurement is usually made through the use of a wire, foil, or semiconductor element intimately bonded to the structure. By measuring the change in the electrical resistance of the element, which resistance is a function of the change in cross-section of the element due to alterations in the dimensions of a structure, it is possible to accurately measure the load applied to the structure.

Many transducer devices have been developed for attachment to structures for measuring the amount of stress applied thereto. U.S. Pat. Nos. 3,444,390 to Breidenbach et al. and 4,171,646 to Dybel et al. both disclose measuring devices for use on machine tools such as forges, presses, and the like. Generally, such prior art devices are not sufficiently sensitive or physically constructed to be readily adaptable for use in areas of a machine near the tool in order to directly measure forces on the tool. For example, the transducer arrangements disclosed in the above-mentioned patents are incapable of directly measuring the working load on a tool. This inability to directly measure tool loading is a particularly acute problem when it is desired to monitor the individual loads on a plurality of tools carried on a common base and caused to do work simultaneously.

Ideally, the apparatus for measuring the work forces in a machine tool may be mounted substantially or totally within a machine so that it is protected from physical damage resulting form inadvertent impact or from contamination by debris or lubricants. It is also desirable that the load measuring apparatus be accessible for removal, inspection, maintenance, or repair.

SUMMARY OF THE INVENTION

The present invention relates to a load sensing probe adapted for mounting within a back-up member of a machine through which compressive tool work forces pass. The back-up member can be embodied as a tool support face plate having a laterally-extending cavity for accommodating the probe. The probe is adapted to sense relative closing movement between opposing sides of the accommodating cavity, the movement caused by compressive stress in the face plate resulting from the tool work forces. The probe is elongate in configuration and engages the inner wall of the cavity to sense the work forces acting on immediately adjacent tooling areas. The probe is selective in its sensitivity so that it can be employed in a face plate at a discrete point of a limited area as compared to the total projected area of the face plate. Accordingly, several similar probes, one for each tool station, can be utilized in a single face plate supporting a plurality of spaced tools.

The probe defines an elongate plug having a cylindrical head, a stem, and a disk-shaped sensing member. A plurality of conventional strain gauges are mounted on the sensing member to detect compressive strain. A central aperture extends along the longitudinal axis of the probe. A first pair of aligned slots formed in the sensing member and a portion of the stem also extend along the longitudinal axis. A second pair of aligned slots which are oriented at right angles to the first slots are formed in an overlapping portion of the stem and the cylindrical head. An elongate pin having an tapered end portion is longitudinally inserted through the aperture into threaded cooperation with a nut. Upon tightening the nut, the tapered end of the pin is drawn into the split plug, causing the halves of the sensing member to be pushed outwardly into frictional engagement with the inside wall of the accommodating cavity until a desired predetermined level of preloading is reached. Tool working forces result in relative closing movement of the cavity, which movement causes dimensional changes in the sensing member which can be measured by the strain gauges.

It is an object of the present invention to provide a sensor to continuously monitor operating conditions and parameters in a machine tool.

It is another object of the present invention to provide an apparatus to monitor the individual loads of a plurality of tools carried on a common base and caused to work simultaneously.

It is a further object of the present invention to provide a load sensing probe, in a multi-station machine tool, which is accessible for inspection, removal, and maintenance.

Other objects and advantages of the present invention will become apparent to those skilled in the art from the following detailed description of the preferred embodiment, when read in light of the accompanying drawings.

BRIEF DESCRIPTION OF THE DRAWINGS

FIG. 3 is an exploded view of the first embodiment of a load sensing probe according to the instant invention;

FIG. 4 is a top plan view of the first embodiment of a load sensing probe according to the instant invention;

FIG. 5 is a full, sectional view of the first embodiment of a load sensing probe according to the instant invention taken along line 5—5 of FIG. 3;

FIG. 7 is a fragmentary, sectional view of a second embodiment of a load sensing probe according to the instant invention, taken along line 7—7 of FIG. 1;

FIG. 8 is a fragmentary, sectional view of a second embodiment of a load sensing probe according to the instant invention, taken along line 8—8 of FIG. 1; and FIG. 9 is a fragmentary, sectional view of a second embodiment of a load sensing probe according to the instant invention, taken along line 9—9 of FIG. 1.

DESCRIPTION OF THE PREFERRED EMBODIMENT

Figure 1:
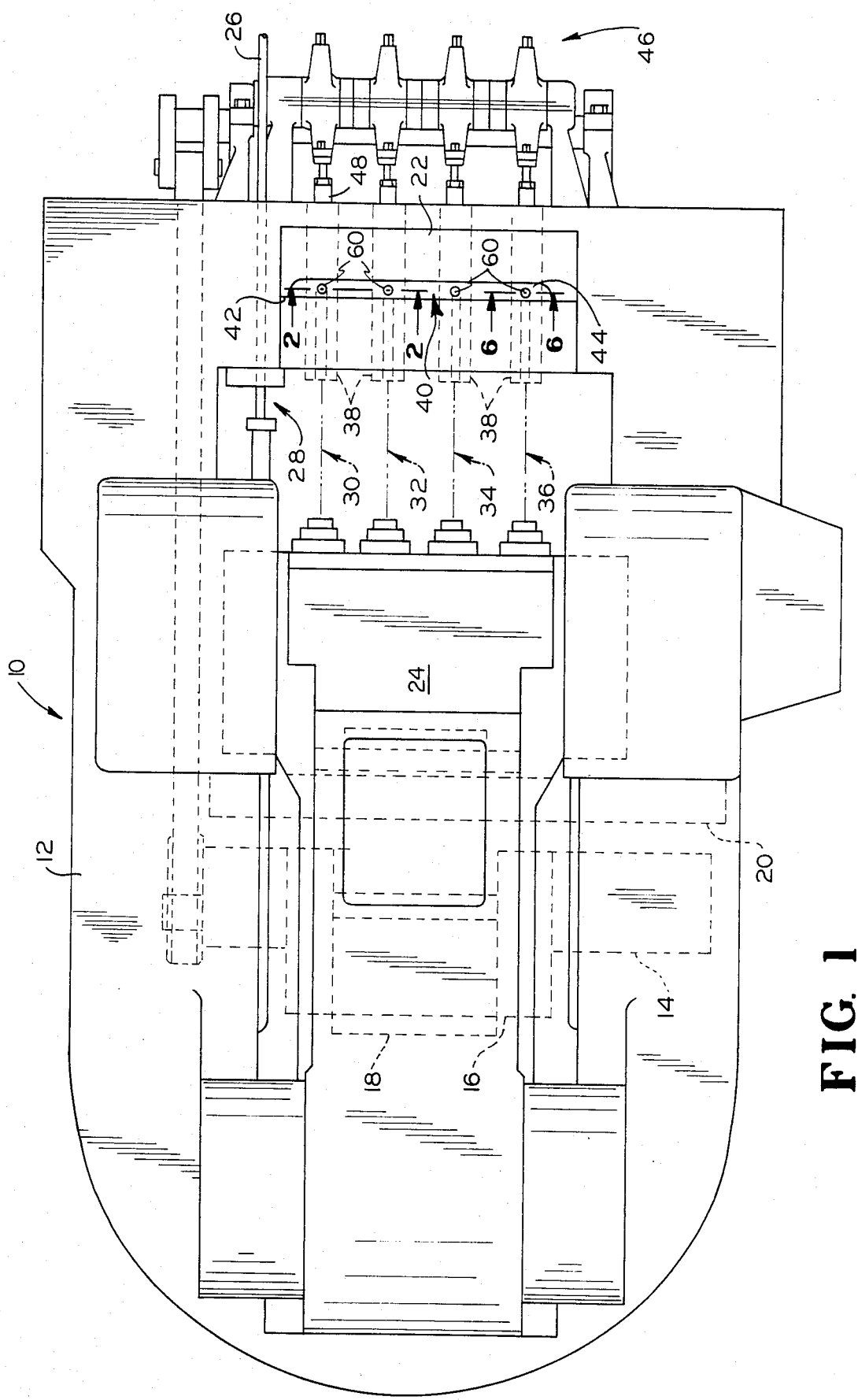
FIG. 1 is a top plan view of a press machine having a plurality of progressive die stations which are provided individual load sensing probes fabricated according to the instant invention.

Referring now to FIG. 1, there is illustrated a press machine, such as a forging or stamping machine generally designated by the reference numeral 10. The forging machine 10 includes a bed frame 12 of any suitable design. A main crankshaft 14 is journalled in opposite sides of the bed frame 12 and is provided with a crank 16 having a connecting rod 18 journalled thereon. A countershaft 20 is geared to the crankshaft 14 through unity ratio gearing (not illustrated) for rotation at the same speed as the crankshaft 14. The bed frame 12 is provided at its forward end with a die breast 22. Within guideways formed in the bed frame 12 is mounted a header slide 24 which reciprocates toward and away from the die breast 22. The connecting rod 18 is pivoted on the slide 24 to produce reciprocation thereof in response to rotation of the crank 16.

Wire or rod stock 26 is fed through the bed frame 12 by any conventional type of feed mechanism such as rollers or the like. The stock 26 is sheared at a shearing station 28 into appropriate blanks. A shearing mechanism (not illustrated), such as that disclosed in U.S. Pat. No. 2,721,343 shears off a blank and carries it into alignment with successive blank working stations 30, 32, 34 and 36. Transfer fingers (not illustrated) of a transfer mechanism such as that disclosed in U.S. Pat. No. 2,026,823 operate to grip blanks ejected from a plurality of tooling dies 38 at the blank working stations 30, 32, 34 and 36 and progressively position the ejected, partially tooled blanks at the next working station for further tooling or working. The transfer mechanism is powered in timed relationship with the movement of the header slide 24 so that blanks are progressively moved to each of the working stations 30, 32, 34 and 36 during the non-working portion of the reciprocation cycle of the slide 24.

Removably secured to the die breast 22 is a die block backup member such as a face plate 40. The face plate 40 supports the tooling dies 38 by sustaining the compressive forces generated by the movement of the header slide 24. A working face 42 of the face plate 40 is oriented toward the header slide 24 and supports the tooling dies 38 at the successive working stations 30, 32, 34, and 36 against forces directed principally along axes parallel to the movement of the slide 24 during the working portion of its reciprocating cycle. A side face 44 of the face plate 40 extends generally at right angles to the working face 42 and defines a plane spaced laterally from the working stations 30, 32, 34 and 36.

Figure 2:
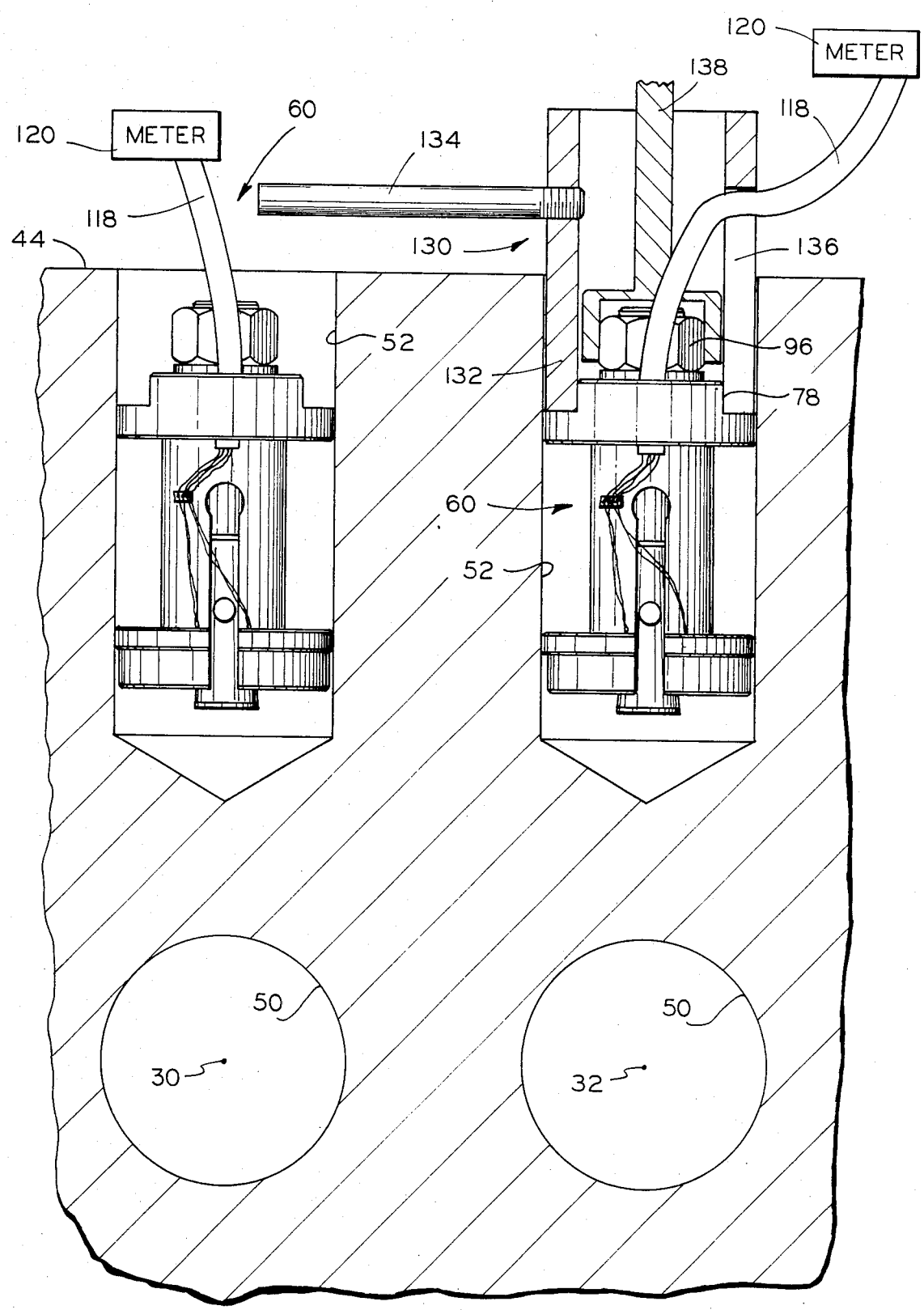
FIG. 2 is a diagrammatic sectional view of a pair of individual load sensing probes according to a first embodiment, taken along line 2—2 of FIG. 1.
Figure 6:
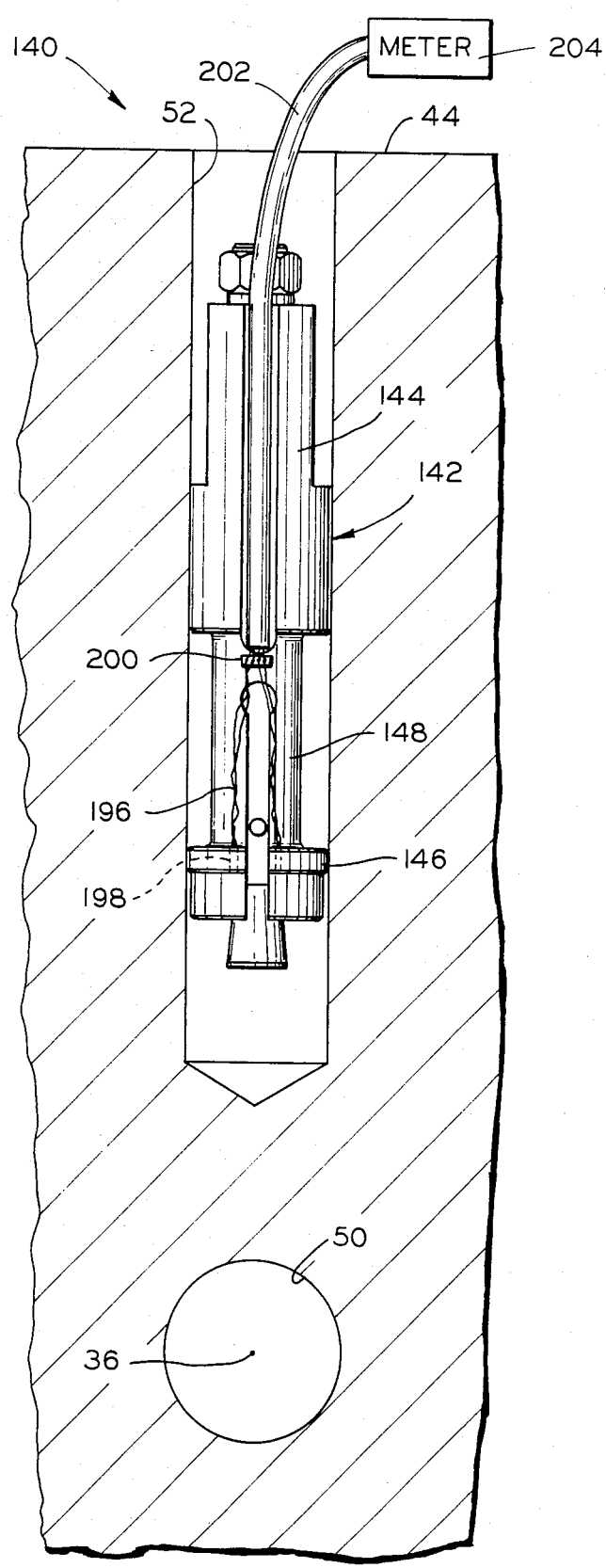
FIG. 6 is a fragmentary, sectional view of a second embodiment of a load sensing probe according to the instant invention, taken along line 6—6 of FIG. 1.

With reference now to FIGS. 1 and 2, a blank ejecting assembly 46 which is driven from the crankshaft 14 such that it operates in timed relationship to the reciprocation of the slide 24 includes a plurality of knock-out pins 48 which extend through a like plurality of bores 50 disposed in the face plate 40. The bores 50 are in registration with a respective one of the blank working stations 30, 32, 34 and 36 and extend from the working face 42 through the body of the plate 40. The knock-out pins 48 are thus likewise aligned with the working stations 30, 32, 34 and 36 and, reciprocating in timed relationship with the slide 24, eject the blanks from the tooling dies 38. The bores 50 are formed along axes generally parallel to the direction of movement of the slide 24 and thus the principal forces borne on the face plate 40 are directed along axes coincident with the axes of the associated bores 50.

At each of the working stations 30, 32, 34 and 36, there is formed in the face plate 40 a blind cylindrical cavity 52 extending toward and preferably aligned radially with the axes of each of the bores 50. The cavities 52 are spaced axially from the working face 42 of the plate 40 and receive probes 60. Each of the cavities 52 extending into the side face 44 is generally cylindrical and of a uniform diameter along its length and has its central axis disposed generally normal and radial to the axis of one of the tools as defined by each of the bores 50 associated with one of the blank working stations 30, 32, 34 and 36.

Referring now to FIGS. 2, 3, 4 and 5, a load sensing probe 60 according to a first embodiment is received and disposed within the cavities 52 as noted above. The probe 60 is generally cylindrical and includes a split plug body 62 having a first, enlarged diameter end region 64, a second, enlarged diameter end region 66 which functions as the sensing portion of the split plug body 62 and an intermediate reduced diameter shank portion 68. Both the first and second enlarged diameter end regions 64 and 66 are slightly smaller in diameter than the inside diameter of the cavity 52 into which the probe 60 is inserted. The circumferential edges of the second end region 66 may be bevelled as illustrated to facilitate insertion of the probe 60 into the cavity 52. The split plug body 62 defines a through bore 70 which is disposed concentrically about the longitudinal center axis of the plug body 62. One end of the through bore enlarges into a frusto-conical surface 72 which is disposed generally within the first enlarged end region 64. The first enlarged end region 64 includes a longitudinally oriented through bore or passageway 74. The first enlarged diameter end region 64 also includes a pair of parallel, opposed flats 78 which may be engaged by a suitably configured spanner wrench as will be more fully described subsequently. The split plug body 62 defines a first pair of through slots 80 extending away from the first end region 64 and a second pair of through slots 82 extending away from the second end region 66. The first pair of slots 80 and the second pair of slots 82 overlap or extend beyond one another as is apparent from FIG. 5, are oriented parallel to the axis of the split plug body 62 and are oriented at right angles to one another. A radially oriented aperture 84 and a radially oriented aperture 86 also oriented at right angles to one another are disposed, respectively, at the termini of the first pair of through slots 80 and the second pair of through slots 82.

Reference to FIG. 2 permits ready appreciation of the fact that the probe 60, due to its diametral configuration, may be inserted and fully received within the cavity 52 of the face plate 40, a feature which is both novel and beneficial as well as distinct from the probe configuration disclosed in the above-referenced parent patent. Such mounting is facilitated through cooperation of the split plug body 62 with an elongate or wedge pin 90, a wedge collar 92 having a through opening 94 and a threaded fastener 96 such as a nut. The elongate wedge pin 90 includes a threaded portion 98 having threads complementary to those within the threaded fastener 96, a frusto-conical surface 100 disposed generally opposite the threaded portion 98 and a radially disposed cross pin 102 seated within a suitably sized retaining aperture 104 oriented radially to the axis of the elongate wedge pin 90.

The second enlarged diameter end region 66 of the split plug body 62 functions as the sensing portion thereof and as such includes a strain gauges 110 secured by conventional means to a surface of the second end region 66 disposed at a right angle to the axis of the split plug body 62. The output of the plurality of strain gauges 110 is carried by a plurality of conductors 112 through openings 114 in the end region 66 to a junction block 116. At the junction block 116, an appropriate heavier gauge and more durable multiple conductor cable 118 is electrically connected to the conductors 112 and carries signals from the strain gauges 110 through the passageway 74. The signals carried by the multiple conductor cable 118 are ultimately received and displayed by a suitable indicating device such as a meter 120. The meter 120 is sensitive to the changes in electrical resistance of the strain gauges 110 causes by changes in stress applied to the second enlarged diameter end region 66 which, as noted above, functions as the sensing member of the probe 60.

Securement of the probe 60 within one of the cavities 52 is achieved by expansion of the ends of the split plug body 62. Such expansion is effected by rotation of the threaded fastener 96 on the elongate wedge pin 90. Wedging action and radially outward movement of the halves of the first end region 64 and second end region 66 is thus achieved such that these regions engage the inner walls of the cavity 52, securely retaining the probe 60 therein. As illustrated in FIG. 2, such mounting and securement is facilitated by the use of a spanner wrench 130. The spanner wrench 130 is generally tubular and includes a pair of diametrically opposed legs 132 having parallel surfaces which engage the flats 78 on the first enlarged diameter end region 64 of the split probe body 62. The spanner wrench 130 includes a generally radially extending handle 134 for facilitating torque application. The spanner wrench 130 also includes a longitudinal slot 136 for receiving the multiconductor cable 118 during the installation procedure. During such installation procedure, a conventional socket wrench 138 of a size suitable to engage the threaded fastener 96 may thus be inserted into the central hollow region of the spanner wrench 130. Since the split plug body 62 may be both rotated into proper orientation within the cavity 52 and maintained in a stationary position as desired, and the elongate wedge pin 90 is restrained against motion by virtue of engagement of the cross pin 102 within the second pair of through slots 82, rotation of the socket wrench 138 and threaded fastener 96 will result in radial expansion of the first and second enlarged diameter end regions 64 and 66, respectively, causing engagement therewith of the walls of the cavity 52 as above noted. Calibration of the strain gauges 110 which is achieved by radially compressively preloading the second end region 66 of the plug body 62 will be addressed subsequently.

Referring now to FIGS. 6, 7, 8 and 9, a second embodiment of a load sensing probe according to the instant invention is illustrated and designated by the reference numeral 140. The load sensing probe 140 is likewise disposed within a cavity 52 of the face plate 40 of a press or forging machine 10. The second embodiment load sensing probe 140 is similar in most respects to the first embodiment load sensing probe 60 and includes a split plug body 142 having an enlarged diameter central region 144 and an enlarged diameter end region 146 which functions as the sensing portion of the split plug body 142 and an intermediate, reduced diameter shank portion 148. Both the first and second enlarged diameter regions 144 and 146 are slightly smaller in diameter than the inside diameter of the cavity 52 into which the probe 140 is inserted. The circumferential edges of the second enlarged diameter end region 146 may be bevelled as illustrated, to facilitate insertion of the probe 140 into the cavity 52. The elongate split plug body 142 defines a stepped, through bore 150 which is disposed concentrically about the longitudinal axis of the plug body 142. The walls of the bore 150 define a frusto-conical shoulder 152 generally medially disposed along the axial length of the bore 150 which divides the bore 150 into a larger diameter region 150A and a smaller diameter region 150B. The plug body 142 also includes a pair of parallel, opposed flats 154 which may be engaged by a wrench or a suitably configured spanner wrench as will be more fully described subsequently. Also extending along the enlarged region 144 is a channel 156 which terminates at the end of the plug body 142 opposite the end region 146. The split plug body 142 also defines a first pair of through slots 158 extending away from the enlarged central end region 144 and a second pair of through slots 160 extending away from the enlarged end region 146. The first pair of slots 158 and the second pair of slots 160 overlap or extend beyond one another as is apparent from FIGS. 7 and 9, are oriented parallel to the axis of the split plug body 142 and are oriented at right angles to one another. A radially oriented aperture 162 and a radially oriented aperture 164 also oriented at right angles to one another are disposed, respectively, at the termini of the first pair of through slots 158 and the second pair of through slots 160.

The second embodiment of the probe 140 also includes an elongate wedge pin 170, a wedge bushing 172 having a frusto-conical surface 174 disposed thereon and a through opening 176 axially and concentrically disposed therein and a threaded fastener 178 such as a nut. The elongate wedge pin 170 includes a threaded portion 180 having threads complementary to those disposed within the threaded fastener 96, a frusto-conical surface 182 disposed generally opposite the threaded portion 180 and a radially disposed cross pin 184 seated within a suitably sized retaining aperture 186 oriented radially to the axis of the elongate wedge pin 170.

The enlarged diameter end region 146 of the split plug body 142 functions as a sensing portion thereof and includes a plurality of strain gauges 192 secured by conventional means to a surface 194 of the enlarged end region 146 disposed at a right angle to the axis of the split plug body 142. The output of the strain gauges 192 is carried by a plurality of conductors 196 through openings 198 in the end region 146 to a junction block 200. At the junction block 200, conductors in a heavier gauge and more durable multiple conductor cable 202 are electrically connected to the individual conductors 196 and carry signals from the strain gauges 192. The signals carried by the multiple conductor cable 202 are ultimately received by and displayed on a suitable indicating device such as a meter 204. A meter 204 is sensitive to the changes in electrical resistance of the strain gauges 192 caused by changes in stress applied to the halves of the second enlarged diameter end region 146 which, as noted above, functions as the sensing member.

Mounting of the second embodiment of the probe 140 is accomplished in a manner similar to or identical to that of the first embodiment of the probe 60 except that due to the elongate nature of the probe body 142, it may be positioned to extend somewhat beyond the cavity 52 in the face plate 40 such that the flats 154 on the first enlarged end region 144 of the split probe body 142 may be engaged by a conventional wrench. It should thus be apparent that the threaded fastener 178 may then also be engaged by any conventional wrench or similarly sized engaging and rotating device.

Calibration of the strain gauges 192 is achieved by radially compressively preloading the second enlarged diameter end region 146 during the mounting procedure which will be described below. As noted above with regard to both the first and second embodiments of the sensing probe 60 and 140, respectively, both mounting and calibration which is effected by preloading radially compressive forces into the split plug bodies 62 and 142, respectively, will not be described. For purposes of simplicity, such preloading and calibration will be described only with regard to the first embodiment sensing probe 60 and the parallelism of elements and procedure will be readily apparent with regard to the second embodiment sensing probe 140.

To calibrate and utilize the load sensing probe 60, the elongate wedge pin 90 is first inserted through the bore 70 of the split plug body 62 and into threaded engagement with the threaded fastener 96. The probe 60 is then inserted within the cavity 52 and secured in position by a previously described securement procedure. Typically, the meter 120 will include a calibration mode which will sense and indicate an appropriate quantum of preload force on the split plug body 62 and specifically the sensing and, the second enlarged diameter end region 66. Appropriate calibration is achieved by tightening the threaded fastener 96 thereby drawing the elongate wedge pin 90 into the split plug body 62 causing the frusto-conical surface 100 of the wedge pin 90 to attempt to radially outwardly move the halves of the end region 66 and thus apply increasing force to these members such that they exert increasing force against the inside walls of the cavity 52. This procedure is continued until the meter 120 indicates a proper preload on the plug body 62 by appropriate compressive strain on the strain gauges 110.

Tool loading impressed on the face plate 40 through the working face 42 in the vicinity of each of the bores 50 places the underlying material of the face plate 40 in compression. This compression of the face plate 40 collapses the opposite sides of the cavity 52 and tends to form an ellipse having its minor axis in a direction parallel to the plane of the surface of the second enlarged end region 66 upon which the strain gauges 110 are mounted. A strain experience by these elements is proportional to the tool working forces applied to the working face 42 of the face plate 40, causing radial dimensional changes in the surface of the second enlarged end region 66. In a conventional manner, the strain gauges 110 operate as transducers and effect a resistance change proportional to the strain experienced thereby. These resistance changes may be sensed by passing a small electrical current through the strain gauges 110, through the associated wiring and to the meter 120. These signals can be compared with ideal signals to detect tool failures, improper tool adjustment, premature wear, imperfect work pieces and other defects in order to maximize product uniformity and quality and minimize production costs.

The small, elongate structure of the probes 60 and 140 occupy a relatively small volume in the active area of the face plate 40 and are particularly adapted for use in machines where space in the region of monitoring interest is at a premium. Furthermore, since both of the probes 60 and 140 are adapted to reside wholly within the cavities 52 of the press 10, they are both less likely to receive abuse while improving their adaptability to various machine applications. The configuration of the probes 60 and 140 is especially useful in applications similar to those disclosed herein where a plurality of die or stamping stations are provided in a common support or back up plate. By virtue of its placement in the cavities 52, the probes 60 and 140 are discriminating in their measurement of local strain associated with a given working station and avoid undue influence from adjacent working stations. For this reason, a unitary support block such as a face plate 40 can be employed to support a plurality of tools at successive work stations but still through the use of the individual probes provide individual measurement of the working forces associated with each of the working stations.

The foregoing disclosure is the best mode deviced by the inventors for practicing this invention. It is apparent, however, that apparatus incorporating modifications and variations will be obvious to one skilled in the art of force measuring devices. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A load sensing probe for measuring work forces in a machine tool comprising, in combination,
   a generally cylindrical member having first and second regions of substantially equal outside diameter and a third, intermediate region smaller than and disposed between said first and said second regions,
   slots extending from said first and said second regions into said intermediate region, said slots disposed at a right angle to one another and defining pairs of spaced-apart arms,
   strain gauge means secured to a pair of said spaced-apart arms for sensing the strain experienced by said arms, and
   preloading means for radially translating said pairs of arms, said preloading means including a pair of wedge means for driving said pairs of arms radially outwardly and means for translating said wedge means toward one another.

2. The load sensing probe of claim 1 wherein such machine tool includes a circular cavity having a diameter and said first and second regions of said probe are smaller in diameter than such cavity diameter.

3. The load sensing probe of claim 1 wherein one of said first and second regions includes at least a pair of opposed flats, whereby said flats may be engaged by a complementarily configured apparatus.

4. The load sensing probe of claim 1 wherein said wedge means defines a pair of frusto-conical surfaces.

5. The load sensing probe of claim 1 wherein said translating means includes a threaded rod and a complementarily threaded fastener.

6. The load sensing probe of claim 5 wherein said threaded rod includes a radially disposed pin, and wherein said pin is received in said slots.

7. The load sensing probe of claim 1 further including a radially extending surface defined by one of said first and second regions and at least one strain gauge secured to said radially extending surface.

8. The load sensing probe of claim 1 further including a centrally disposed bore extending axially through said cylindrical member, said bore intersected by said slots.

9. The load sensing probe of claim 1 wherein said pair of arms of said second region define radially extending surfaces having at least one strain gauge secured thereto.

10. In a machine having a back-up member arranged to support a tool at a working station and subject to strain from the work forces applied to the tool, a load sensing probe disposed in a cavity for measuring such work forces comprising, in combination,
  a generally cylindrical member having first and second regions of substantially equal outside diameter and a third, intermediate region smaller than and disposed between said first and said second regions,
  a centrally disposed bore extending through said cylindrical member,
  first and second pairs of slots extending from a respective one of said first and said second regions into said intermediate region, said first pair of slots disposed at a right angle to said second pair of slots and defining spaced-apart arms,
  strain gauge means secured to one of said pair of spaced-apart arms for sensing the strain experienced by said arms, and
  preloading means for radially translating said pairs of arms, said preloading means including a pair of wedge means for driving said pairs of arms radially outwardly and means for translating said wedge means toward one another.

11. The load sensing probe of claim 10 wherein said strain gauge means are secured generally to said first region and said second region includes at least a pair of opposed flats, whereby said flats may be engaged by a complementarily configured apparatus.

12. The load sensing probe of claim 10 wherein said wedge means includes a pair of frusto-conical surfaces.

13. The load sensing probe of claim 10 wherein said wedge means includes at least one frusto-conical surface aligned with and engaging a complementarily formed frusto-conical surface in said cylindrical member.

14. The load sensing probe of claim 10 wherein said translating means includes a threaded rod having a frusto-conical surface disposed at one end and a complementarily threaded fastener disposed at the other end.

15. The load sensing probe of claim 14 wherein said threaded rod includes a radially disposed pin and wherein said radially disposed pin is received within one of said pair of slots.

16. The load sensing probe of claim 10 wherein at least one of said first and said second regions includes axially disposed passageways suitable for receiving electrical wires.

17. A method of measuring work forces applied to a back-up member in a machine tool having an elongate cavity extending laterally from a point adjacent the working station, comprising the steps of:
  inserting a load sensing probe into such cavity, said probe having a cylindrical body having a first and second enlarged end regions split by respective pairs of axially extending radially oriented slots to form respective pairs of arms, and strain gauges secured to the arms of one of said enlarged end regions, opposed flats disposed on the other of said enlarged end regions and means for radially translating said arms,
  engaging said flats with a complementarily configured apparatus while activating said radially translating means to move said sensing arms into engagement with the wall of said cavity and
  measuring the work forces applied to the back-up member as relative closing movement of the cavity.

* * * * *